Patented Dec. 17, 1935

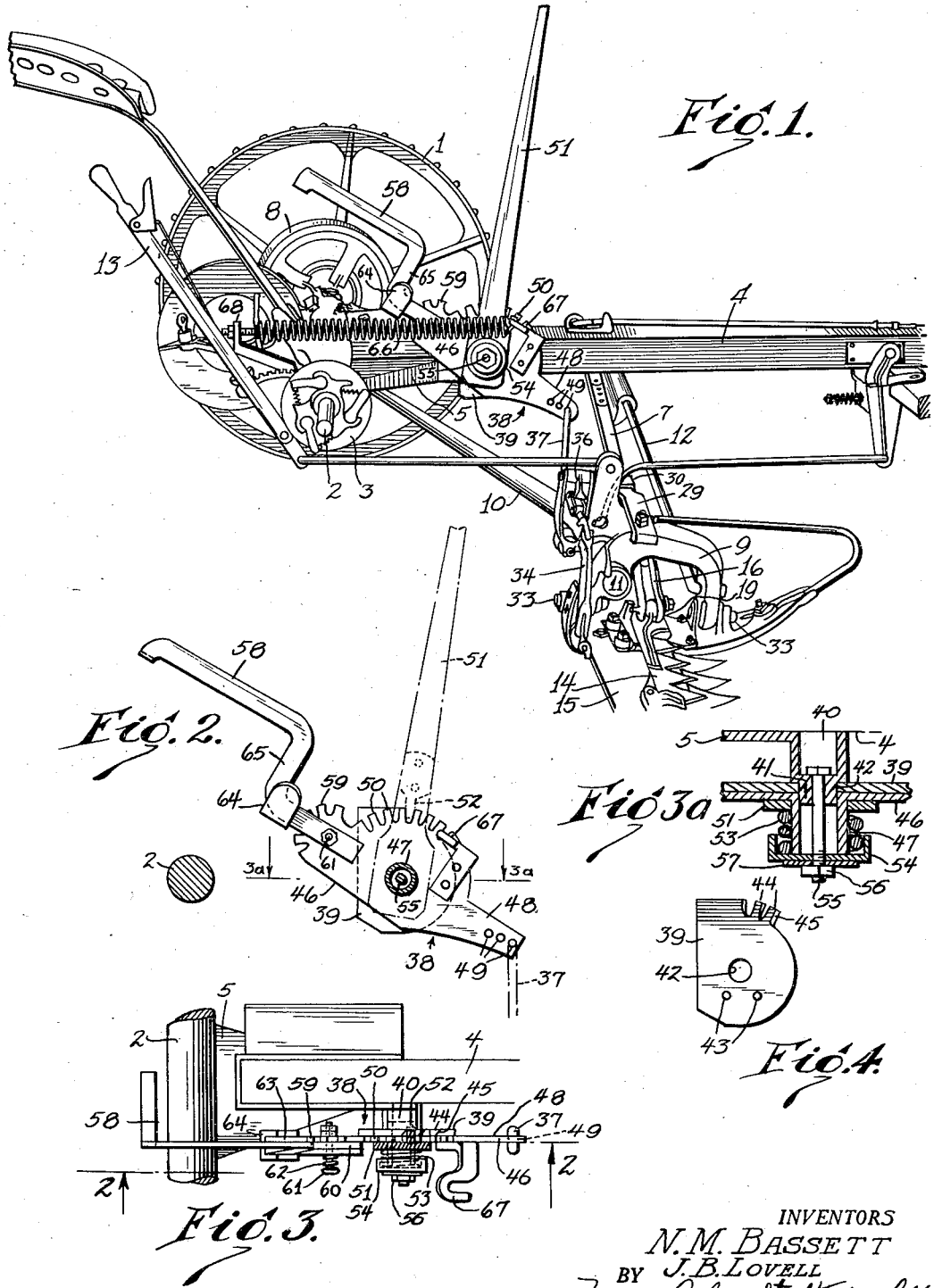

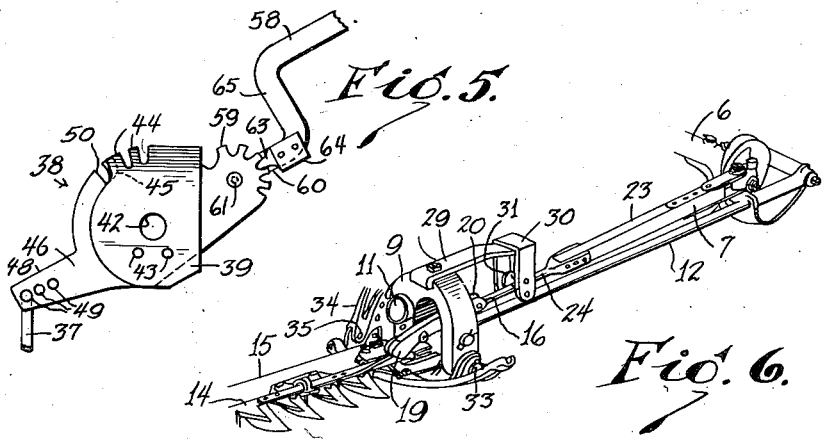
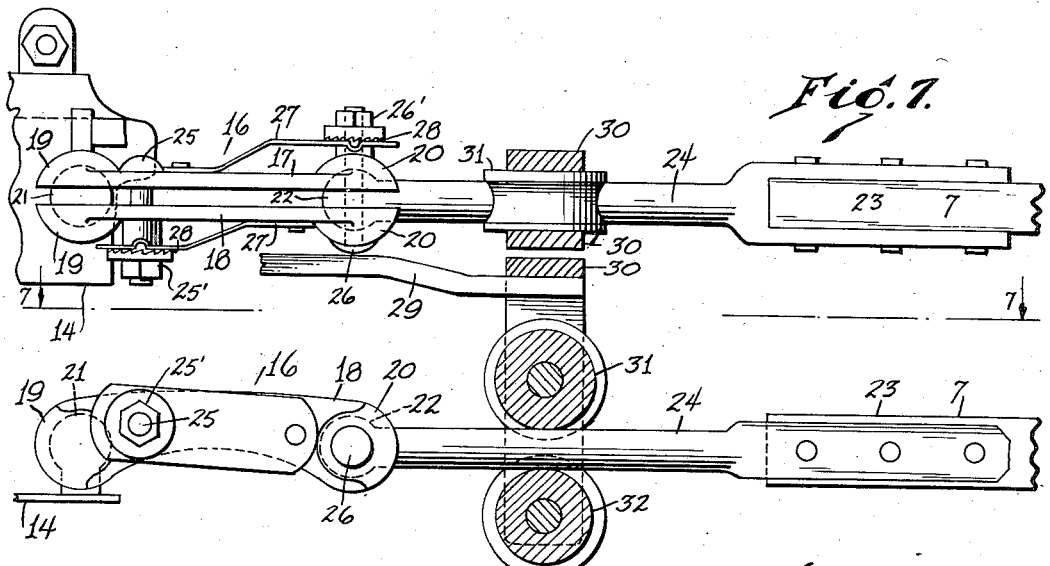
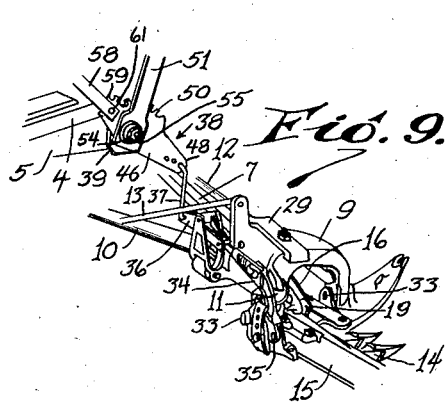

2,024,500

UNITED STATES PATENT OFFICE 2,024,500

MOWING MACHINE ATTACHMENT

Noble M. Bassett and John B. Lovell, Newman, Calif.

Application September 20, 1933, Serial No. 690,280

7 Claims. (Cl. 56—272)

The present invention relates to improvements in mowing machines, and its principal object is to provide, in combination with the conventional mowing machine, an attachment which will allow the sickle bar to be swung downwardly or upwardly at a larger angle than has heretofore been possible for the purpose of mowing the sides of a levee and of a ditch.

In a conventional mowing machine the sickle can be raised through a slight angle, but this is not sufficient to allow the side of a levee to be mowed satisfactorily. No provision whatever is made in the conventional mowing machine for allowing the side of a ditch to be mowed, and as a matter of fact, if the present mowing machine is used for the mowing of a ditch with the right-hand wheel riding on the ditch levee the sickle will merely project horizontally from the mowing machine so that the side of the ditch is left practically untouched.

With our attachment, it is possible to raise the sickle substantially at an angle of 45° without interfering with the action of the pitman driving the sickle so that a comparatively steep levee can be mowed satisfactorily, while on the other hand it is also possible to lower the sickle through an angle of substantially 45° without interfering with the action of the pitman so that any conventional ditch may be mowed satisfactorily.

More particularly it is proposed to provide two different improvements in the mowing machine which coact in producing the desired result. In the first place, it is proposed to provide a link connection between the pitman and the sickle which allows the pitman to operate the sickle at the angles indicated, and in the second place it is proposed to provide manually operated or foot operated means for effecting the desired adjustment in angularity of the sickle, or sickle bar.

Further objects and advantages of our invention will appear as the specification proceeds.

The preferred form of our invention is illustrated in the accompanying drawings, in which Figure 1 shows a perspective view of a mowing machine provided with our attachments, the right-hand wheel being omitted to disclose the essential operating parts;

Figure 2 a section on the line 2—2 of Figure 3 showing the operating mechanism for changing the angularity of the sickle bar;

Figure 3 a top plan view of the said operating mechanism;

Figure 3a, a section taken along line 3a—3a of Figure 2;

Figure 4 a detail view of a fixed element of the said operating mechanism;

Figure 5 a side elevation of the operating mechanism taken from the opposite side to that of Figure 2;

Figure 6 a perspective detail view of the pitman and sickle arrangement;

Figure 7 a section on the line 7—7 of Figure 8 showing a plan view of the connection between the sickle bar and the sickle;

Figure 8 a side elevation thereof, certain portions being shown in section; and

Figure 9 a diagrammatical perspective detail view disclosing the mechanism for raising and lowering the sickle to the desired angularity.

While we have shown only the preferred form of our invention we wish to have it understood that various changes or modifications may be made within the scope of the claims hereto attached without departing from the spirit of the invention.

The general arrangement of a mowing machine is illustrated in its important features in Figure 1, and comprises a pair of wheels 1, only one of which is shown, a shaft 2 connecting the wheels, a one-way driving mechanism 3 between the wheels and the shaft, a tongue 4, a frame 5 supported relative to the axle and the tongue and including, on the left-hand side of the mowing machine, a housing 6 for the eccentric used for driving the pitman 7, a driving mechanism indicated generally at 8 for driving the eccentric, and a sickle head 9 supported on the pivoted arm 10 with freedom of tilting movement about the end of the arm indicated at 11, a spacing bar 12 holding the head in properly spaced relation to the eccentric housing 6. The sickle head may be turned about its pivot for controlling the depth of the cut by the conventional lever arrangement 13.

The sickle 14 which is of conventional construction is supported with freedom of sliding and reciprocating movement in the sickle bar 15, and reciprocating movement is imparted to the sickle by the pitman 7 driven by the eccentric provided in the housing 6. In conventional practice the pitman 7 is connected to the sickle by a single ball and socket joint, and if the sickle is raised to an angularity greater than a few degrees, the driving element becomes inoperative. In order to allow the drive to remain operative at increased angularities in both directions, we interpose a link connection 16 between the pitman and the sickle, the link connection comprising two side plates 17 and 18, terminating at both ends in substantially semi-spherical sockets 19 and 20 adapted to engage with balls 21 and 22, provided on the sickle and at the end of the pitman respectively. The ball 21 on the sickle is conventional, while the form of the pitman is slightly changed in our invention, the pitman being shortened so as to cause the over-all length of the rigid portion of the pitman and the connecting link to be equal to the length of the conventional pitman and the rigid portion of the pitman being changed to include a conventional wooden portion 23 and a metal rod 24 projecting from the free end thereof, the rod terminating in the ball 22 previously mentioned.

The two sockets 19 and 20 respectively of the two side pieces are held to the balls by means of bolts 25 and 26, and nuts 25′ and 26′ respectively, the nuts operating against springs 27 and being locked thereto in adjusted position by means of ratchet teeth 28. The bolt 26 preferably passes through the ball 22, while the bolt 25 passes through the side pieces 17 and 18 in adjacent relation to the ball 21 so that the latter bolt does not have to be removed when it becomes necessary to change the sickle.

Since this link connection would allow the pitman to buckle, we provide means for preventing buckling in the strap 29 secured to the sickle head 9 and projecting over the pitman and formed in its end with a U-shaped piece 30 straddling the rod 24 of the pitman. This U-shaped piece is provided with rollers 31 and 32 above and below the rod 24 which keep the latter from buckling.

As in the conventional mowing machine, means are provided for changing the angularity of the sickle bar and for raising the sickle bar head which normally rides on the ground surface, but which has to be lifted when the mowing machine is transported over a field in inactive condition. These two movements in the conventional mowing machine, as well as in our improved mowing machine, are combined into a compound movement. The sickle bar 15 is pivotally supported in the head 9 on two horizontally aligned pins 33 and the sickle bar may be swung about these pivots by means of a crooked link 34 engaging the sickle bar at a point 35 slightly spaced from the pivot. The crooked link 34 is connected to one end of a lever 36 and the other end of the lever is connected by means of a freely swinging link 37 to an operating device 38. When the link 37 is raised by the operating device 38 to be described hereinafter, the sickle bar is first swung upwardly about its pivot 33 and after it has been raised to a certain angularity, further upward pull on the link 37 causes the entire head 9 to be lifted off the ground surface. While this mechanism is of conventional construction, we provide an improved operating mechanism which not only allows of greater angularities of the sickle bar relative to a horizontal plane, but also allows the sickle bar to be swung downwardly as compared with the conventional machine, which allows only of angularity of the sickle bar in an upward direction.

Our improved operating mechanism comprises a plate 39 shown in detail in Figure 4 and secured in spaced and parallel relation to the tongue 4 by means of a socket member 40 fastened to the tongue, and having a projecting neck 41 passing through a hole 42 in the plate 39, which latter is held against rotary movement on the neck 41 by suitable bolts passing through holes 43. The plate 39 is formed with a plurality of teeth 44, each tooth having a beveled face as at 45. A second plate 46 is formed with a hub 47 fitting over the neck 41 of the socket 40, so as to be revolvable thereon, and this plate is formed with an arm 48, having a number of holes 49 by means of which it may be engaged with the link 37. The plate 46 is furthermore provided with a series of teeth 50 adapted to be brought into registry with the teeth 44 of the fixed plate 39. A handle 51 is revolvable on the hub 47 and is provided with a projecting lug 52 of sufficient width to be engageable with both sets of teeth of the movable plate 46 and the fixed plate 39 when the handle lies in adjacent relation to the movable plate. The handle 51 is urged into adjacent relation to the plate by means of a heavy spring 53 pressed upon the face of the handle by the cap 54, which in turn is held in place by a bolt 55 passing through the neck 41 and a nut 56 bearing upon the cap through a washer 57. The spring allows the handle to be swung away from the movable plate sufficiently to allow the lug 52 to clear either the teeth of the fixed plate or both the teeth of the fixed and the movable plates.

The operation of the handle may be described as follows: In normal operating position the lug 52 is engaged, as shown in Figure 2, between the central teeth of the movable plate and in one of the recesses formed by the teeth of the plate 39. If the operator desires to raise the sickle to a desired angularity, he presses the handle sidewise so that the lug 52 clears both of the sets of teeth, then moves the handle forward to secure a new bite between any desired set of teeth, and pulls back again until the lug 52 registers with one of the recesses in the plate 39, whereupon the spring urges the lug between the teeth and holds the movable plate in fixed relation relative to the fixed plate 39, the link 37 having been raised to a desired height by this operation for effecting a desired upward angularity of the sickle. If downward angularity is desired the operator first disengages the lug 52 from both sets of teeth, then moves the handle backward for securing a new bite toward the rear end of the movable plate, then moves the handle forward for swinging the movable plate in a forward direction until engagement of the lug 52 with one of the teeth on the fixed plate 39 has been established. This movement allows the link 37 to move downward and allows the sickle to assume an angular position in a downward direction.

The same operation may be performed by the foot lever 58, which cooperates with a rear portion of the movable plate 46. The latter portion is provided with a circular arrangement of teeth 59, and a short bar 60 and the foot lever 58 are pivoted in adjacent relation on a bolt 61, a spring 62 urging the foot lever and the short bar upon the plate. The short bar is provided with a lug 63 engageable between the teeth 59 and also has a pocket 64 in which the lever 58 is received, but which allows the lever 58 to move out of the pocket. For normal operation the lug 63 of the short bar is engaged between any one of the teeth, depending upon the extent of the movement desired, and if the operator wishes to raise the sickle bar, he may depress the lever 58 with his foot, which will cause the link 37 to be lifted for the purposes previously described. Since the foot lever is rather close to the axle 2, it is formed with an offset as shown at 65, and even with this offset it will strike the axle 2 when the hand lever 51 is moved into certain positions, and for this reason we provide the pocket 64 which allows the foot lever 58 when it strikes the axle, to move out of the pocket so that it does not interfere with further movement of the movable plate 46, while on retraction of the movement it automatically returns into the pocket 46.

When the hand lever is engaged in the manner shown in Figure 2, the lug 52 engaged between the teeth of the fixed plate 39 would prevent operation of the foot lever unless the handle be first disengaged from the teeth of the fixed plate, and to facilitate this disengagement we form the teeth with the beveled face 45 previously referred to.

A spring 66 fastened to a hook 67 secured to the plate 46, and to a fixed point 68 of the frame, tends to balance the weight of the sickle head arrangement, and facilitates the operation of the hand lever 51.

We claim:

1. In a mowing machine, a frame, a sickle bar pivoted thereto, a sickle reciprocable therein, a pitman for reciprocating the sickle, a link between the pitman and sickle, said pitman having a cylindrical portion adjacent to the link, a U-member carried by the frame and straddling the cylindrical portion, and rollers carried by the U-member and rotatably engaging with opposite sides of the cylindrical portion for rectilinearly guiding the pitman adjacent to the link.

2. In a mowing machine, a frame, a sickle bar head carried by the frame, a sickle bar pivoted to the head, and manually controlled means for swinging the bar upwardly or downwardly from a horizontal position about the head as a pivot, said means comprising a fixed notched plate, a second plate swingable around the fixed one and being operatively connected to the bar, and a hand lever having a projection engageable at different places in the swingable plate for swinging the latter with respect to the fixed plate into the desired position, and then for securing the two plates together by moving the projection into the desired notch in the fixed plate.

3. In a mowing machine, a frame, a sickle bar head carried by the frame, a sickle bar pivoted to the head, and manually controlled means for swinging the bar upwardly or downwardly from a horizontal position about the head as a pivot, said means comprising a swingable notched plate operatively connected to the bar, and a foot lever pivoted to the plate and having a projection engageable with the desired notch, said lever then being movable for rocking the swingable plate for swinging the bar into the desired position.

4. In a mowing machine, a frame, an axle therefor, a sickle bar pivoted to the frame, a swingable plate operatively connected to the bar and having two sets of notches, a hand lever having a projection engageable with any one of one set of notches for rocking the plate for swinging the bar above or below a horizontal position, and a foot lever having a projection engageable with any one of the second set of notches for rocking the plate.

5. In a mowing machine, a frame, an axle therefor, a sickle bar pivoted to the frame, a swingable plate operatively connected to the bar and having two sets of notches, a hand lever having a projection engageable with any one of one set of notches for rocking the plate for swinging the bar above or below a horizontal position, a short bar pivoted to the plate and having a projection engageable with any one of the second set of notches, said bar having a clip, and a foot lever pivoted to the plate and engageable with the clip for connection with the short bar, said clip permitting the separation of the foot lever and the short bar when the hand lever swings the plate into a position where the foot lever strikes the axle.

6. In a mowing machine, a frame, a sickle bar head supported relative thereto with freedom of swinging movement in a vertical plane, a sickle bar pivoted in said head with freedom of swinging movement in a vertical plane, a sickle reciprocable in the bar, a pitman for reciprocating the sickle, a connecting link between the pitman and the sickle allowing the sickle bar to be swung downwardly as well as upwardly from a horizontal position and controlled means for swinging the sickle bar in either of said directions, the said means comprising a fixed plate having notches therein, a pivoted plate movable relative thereto, a handle having means for fixing the same to the movable plate in relatively different positions and means on the handle engageable in the notches for securing the second plate relative to the first plate.

7. In a mowing machine, a frame, a sickle bar head supported relative thereto with freedom of swinging movement in a vertical plane, a sickle bar pivoted in said head with freedom of swinging movement in a vertical plane, a sickle reciprocable in the bar, a pitman for reciprocating the sickle, a connecting link between the pitman and the sickle allowing the sickle bar to be swung downwardly as well as upwardly from a horizontal position and controlled means for swinging the sickle bar in either of said directions, the said means comprising a fixed plate having notches therein, a pivoted plate movable relative thereto, a handle having means for fixing the same to the movable plate in relatively different positions and means on the handle engageable in the notches for securing the second plate relative to the first plate, the second plate having also a foot pedal securable thereto in relative different positions.

NOBLE M. BASSETT.
JOHN B. LOVELL.